(12) United States Patent
Kawahara et al.

(10) Patent No.: US 7,849,976 B2
(45) Date of Patent: Dec. 14, 2010

(54) ELECTRO-MECHANICAL BRAKE

(75) Inventors: Yoshinari Kawahara, Maebaru (JP);
Atsushi Yokoyama, Yamato (JP);
Hiroyuki Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/455,759

(22) Filed: Jun. 20, 2006

(65) Prior Publication Data

US 2006/0290201 A1    Dec. 28, 2006

(30) Foreign Application Priority Data

Jun. 23, 2005    (JP) ............................. 2005-182766

(51) Int. Cl.
*F16D 66/00*    (2006.01)
(52) U.S. Cl. ................ 188/1.11 E; 188/71.7; 188/72.8; 303/162
(58) Field of Classification Search ................ 303/162, 303/112, DIG. 3; 188/1.11 R–1.11 E, 71.7, 188/71.8, 72.1, 72.7, 72.8, 79.51–79.63
See application file for complete search history.

(56) References Cited

U.S. PATENT DOCUMENTS

| | | | | |
|---|---|---|---|---|
| 4,995,483 A | * | 2/1991 | Moseley et al. | ............ 188/162 |
| 5,388,894 A | * | 2/1995 | Holland et al. | ................ 303/10 |
| 6,176,352 B1 | * | 1/2001 | Maron et al. | ............ 188/1.11 E |
| 6,230,854 B1 | | 5/2001 | Schwarz et al. | |
| 6,279,691 B1 | * | 8/2001 | Takahashi et al. | .......... 188/72.8 |
| 6,913,118 B2 | * | 7/2005 | Gilles | ..................... 188/1.11 E |

FOREIGN PATENT DOCUMENTS

| | | |
|---|---|---|
| DE | 196 52 230 A1 | 6/1998 |
| JP | 7-89420 A | 4/1995 |
| JP | 7 144636 A | 6/1995 |
| JP | 2000-55094 A | 2/2000 |
| JP | 2004-92812 A | 3/2004 |
| JP | 2004 092812 A | 3/2004 |
| WO | WO 99/37939 A1 | 7/1999 |

OTHER PUBLICATIONS

European Search Report dated Aug. 21, 2008 (Four (4) pages).

* cited by examiner

*Primary Examiner*—Xuan Lan Nguyen
(74) *Attorney, Agent, or Firm*—Crowell & Moring LLP

(57) ABSTRACT

An electro-mechanical brake achieves a safe traveling and braking with a high accuracy device for detecting a piston position at which a brake pad and a disk rotor contact each other. A pad contact position detecting device in which an electric circuit is not formed to prevent an electric current from flowing therethrough when a pad pressing force is not generated and the electric circuit is formed to enable the electric current to flow therethrough when the pad pressing force is generated is applied to the electro-mechanical brake. A pad contact position can thereby be detected accurately.

13 Claims, 7 Drawing Sheets

ELECTRO-MECHANICAL BRAKE

BACKGROUND OF THE INVENTION

The present invention relates to an electro-mechanical brake in which a brake pad is driven by a motor to generate a braking force.

JP-A-2004-92812 discloses an example of an electro-mechanical brake for automobile in which a motor other than a hydraulic means drives a brake pad to generate a braking force. In this example, a disk brake system of floating type in which a disk rotor is clamped between brake pads of a pair by the motor, a ball-screw mechanism for converting a rotation of the motor to a linear movement and a linearly movable part of the ball-screw mechanism. In this electro-mechanical brake, a piston position (pad contact position) at which the brake pads contact the disk rotor is detected, a piston is moved with respect to the pad contact position to adjust a clearance (pad clearance) between the brake pad and the disk rotor and control a pad pressing force. Therefore, in such electro-mechanical brake, an accuracy in determining the pad contact position affects an accuracy in adjusting the pad clearance and an accuracy in controlling the pad pressing force. According to the technique disclosed by the publication, in the disk brake, a pressing force sensor and an elastic member are arranged on a piston, a value of the pad pressing force at a timing at which brake pads contact the disk rotor is experimentally predetermined by moving the piston to increase the pad pressing force, and a position of the piston at which an actual pad pressing force becomes slightly greater than the above mentioned value during an operation for actually detecting the pad contact position is determined as the pad contact position to improve the accuracy in detecting the pad contact position.

BRIEF SUMMARY OF THE INVENTION

In the above prior art, there is a problem of that since the output value of the pressing force sensor is used to detect the pad contacting position, the accuracy in detecting the pad contacting position is affected by a resolving power of the pressing force sensor for measuring the pressing force, and there is another problem of that since a changing rate of the pad pressing force with respect to a displacement value of the piston is small, it is difficult for an accurate value of the pad pressing force at the timing of contact between the brake pad and the disk rotor to be obtained experimentally.

An object of the present invention is to provide an electro-mechanical brake in which a pad contact position can be correctly detected without a pressing force sensor to enable a braking force to be controlled correctly so that a vehicle can be driven safely.

According to the invention, an electro-mechanical brake capable of detecting a piston position is characterized by a switch arranged at a position where a pad pressing force is borne when the pad pressing force is generated so that the switch is changed between On condition and Off condition in accordance with whether or not the pressing force is less than a certain level, and an elastic member arranged to urge a movable part of the switch in a return direction opposite to a direction of the pressing force to keep the switch at the On condition when the pressing force is less than the certain level and at the Off condition when the pressing force is not less than the certain level. The pad contacting position can be correctly detected by detecting a position of the piston where the switch is changed between On condition and Off condition.

In the electro-mechanical brake according to the invention, since an electric circuit is not formed to prevent an electric current from flowing therethrough when the pad pressing force is not generated and the electric circuit is formed to allow the electric current to flow therethrough when the pad pressing force is generated so that a pad contact position detector is formed, the pad contact position can be detected accurately during a stoppage or running. According to the invention, since a pressing force sensor for measuring the pad pressing force is unnecessary, a design with taking a reliability of the pressing force sensor under harsh vibration and temperature on vehicle wheel into consideration is not needed, and the electro-mechanical brake of low cost can be provided. Further, by detecting the pad contacting position accurately, an accuracy in controlling the braking force can be improved so that the electro-mechanical brake can provide safe running and braking.

Other objects, features and advantages of the invention will become apparent from the following description of the embodiments of the invention taken in conjunction with the accompanying drawings.

DETAILED DESCRIPTION OF THE INVENTION

An embodiment of the invention is explained hereafter in detail with making reference to FIGS. 1-7.

Figure 1:
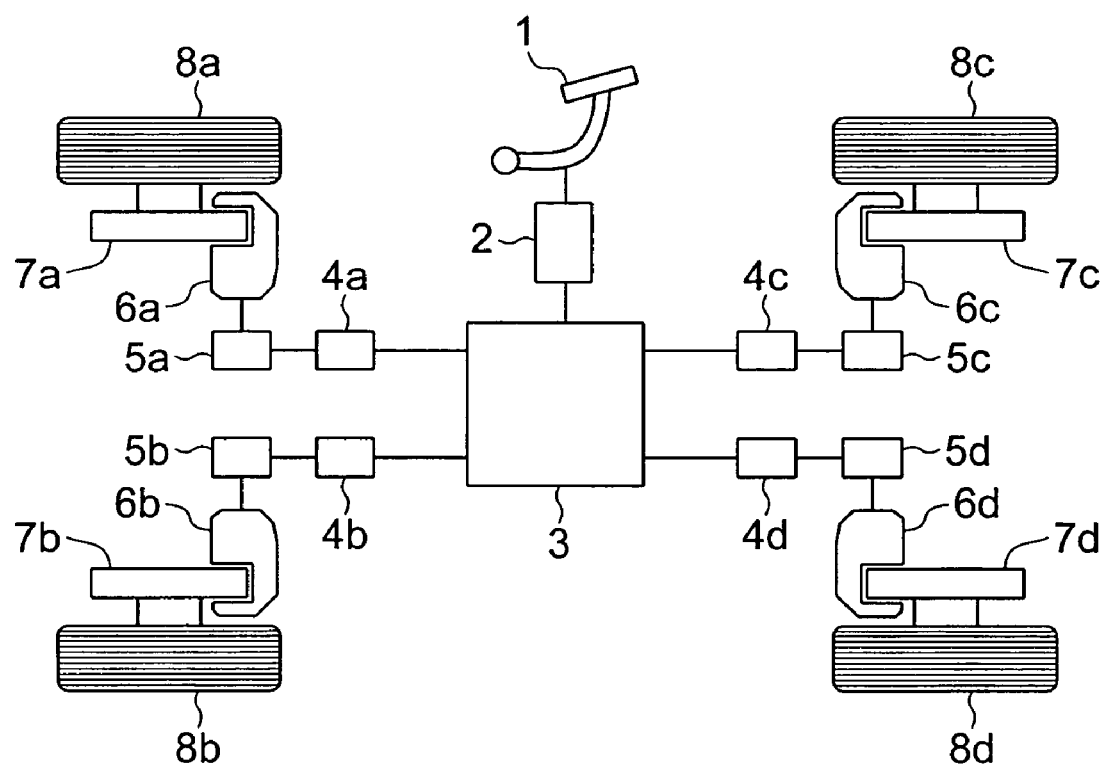
FIG. 1 is a view showing a general system of automobile including electro-mechanical brakes for four wheels.

At first, with making reference to FIG. 1, a system of an electro-mechanical brake system for four-wheels vehicle is schematically explained. In FIG. 1, an electro-mechanical brake of the vehicle has wheels 8a-8d, disk rotors 7a-7d rotatable with the wheels 8a-8d, electro-mechanical brake actuators 6a-6d for pressing the disk rotors 7a-7d, a brake pedal 1, a stroke sensor 2 for converting a moved value of the brake pedal 1 to an electric signal, a main controller 3 for controlling a braking force for each of the wheels in accordance with the electric signal from the stroke sensor 2, electro-mechanical brake controllers 4a-4d for controlling respectively the electro-mechanical brakes for the wheels on the basis of an electric signal output from the main controller 3, and motor drivers 5a-5d for supplying electric currents to motors of the electro-mechanical brake actuators 6a-6d so that the motors are driven in accordance with the electric signals output from the electro-mechanical brake controllers 4a-4d.

Figure 2:
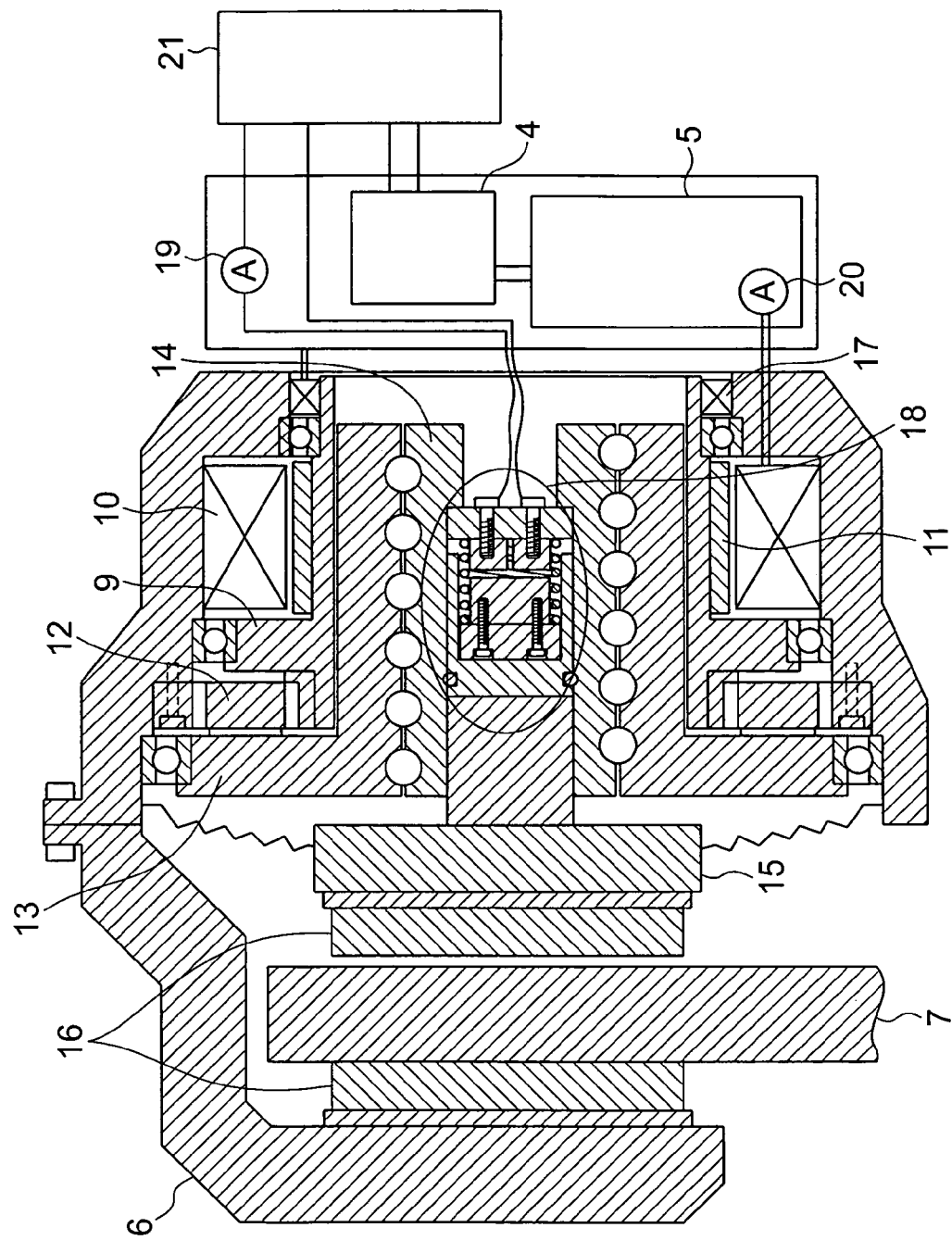
FIG. 2 is a view showing components of the electro-mechanical brake.

A structure and operating mechanism of the electro-mechanical brake actuator 6 is explained with making reference to FIG. 2. The electro-mechanical brake actuator 6 has a motor coil 10 energized by an electric current from the motor driver 5, a motor current sensor 20 for measuring the electric current flowing through the motor coil 10, a motor rotor 9 rotating in accordance with a change of magnetic field of the motor coil, a magnet 11 fixed to the motor rotor 9, a reduction gear 12 for reducing a rotational velocity of the motor rotor 9 to amplify a torque, a ball-screw 13 as a rotational movement-linear movement converting mechanism for converting the reduced rotational movement of the reduction gear 12 to a linear movement, a piston moved linearly by a ball-screw rod 14, brake pads 16a, 16b to be pressed against the disk rotor 7 by the piston, an angular resolver 17 for measuring a rotational movement of the motor rotor 9, a pad contact position detector 18 for detecting the pad contacting position, an ampere meter 19 for measuring a change of electric current generated by the pad contact position detector 18, a motor electric current sensor 20 for measuring the electric current flowing through the motor coil 10, and a battery for applying a voltage to the motor driver 5, the electro-mechanical brake controller 4 and the pad contact position detector 18. Incidentally, as the rotational movement-linear movement converting mechanism, a ball-ramp is usable as substitute for the ball-screw.

A method for controlling the pad pressing force in the above mentioned electro-mechanical brake will be explained in detail. A needed braking force is calculated by the main controller 3 from a pressed value of the pedal by a driver and a movement of the vehicle, a pad pressing force order is determined to be output to the electro-mechanical brake controller 4. The electro-mechanical brake controller 4 calculates a motor position needed to generate a pad pressing force corresponding to the pad pressing force order and the motor electric current needed to achieve the motor position. The motor driver 5 outputs to the motor coil 10 an electric current order enabling the motor electric current calculated by the electro-mechanical brake controller 4 to actually flow through the motor coil 10. When the electric current flows through the motor coil 10 to rotate the motor rotor 9, the piston is driven by the rotation. A rotating value (motor position) of the motor rotor 9 is measured by the angular resolver 17 to feed back the measured motor position to the electro-mechanical brake controller 4 so that the motor position is controlled. Since the pad pressing force is determined univocally by the motor position and a rigidity of the electro-mechanical brake actuator, the pad pressing force can be estimated by the motor position and the rigidity of the electro-mechanical brake actuator predetermined experimentally. Therefore, by controlling the motor position, the pad pressing force can be controlled. If the pad contacting position at which the pad pressing force becomes more than zero when moving the piston toward the pad to increase the pad pressing force is detected correctly, the pad pressing force can be controlled correctly. Incidentally, the pad contacting position is a position at which the pad pressing force becomes zero when moving the piston away from the pad to decrease the pad pressing force. In the electro-mechanical brake, the pad pressing force is controlled by controlling the motor position.

Figure 3:
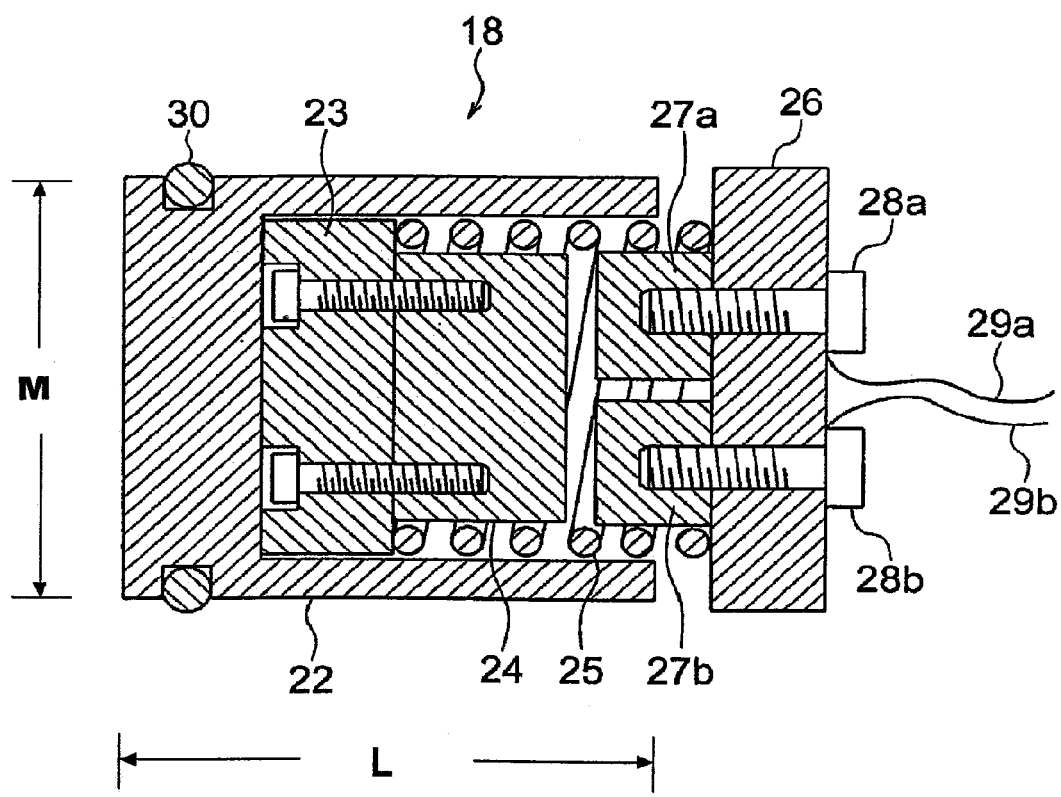
FIG. 3 is a view showing an embodiment of a pad contacting position detector.

FIG. 3 shows in detail the pad contact position detector 18. The pad contact position detector 18 has a plunger 22 movable linearly in a hollow area of the rod 14 of the ball-screw, an insulating member 23 received by a hollow area of the plunger 22, a conductive member 22 fixed to the insulating member 23, an insulating plate 26, a pair of electrodes 27a and 27b fixed by conductive screws 28a and 28b, lead wires 29a and 29b connected to the electrodes 27a and 27b, and a spring 25 arranged between the insulating member 23 and insulating plate 26 to be urged away from each other.

An operation and function of the pad contact position detector 18 will be explained with making reference to FIG. 3. Positive and negative electric potentials generated by the battery 21 are applied to respectively the lead wires 29a and 29b of the pad contact position detector 18 connected to respectively the electrodes 27a and 27b through the respective conductive screws 29a and 29b. Therefore, since the electric potential is generated between the electrodes 27a and 27b, the electric circuit is formed by the conductive member 24, the electrodes 27a and 27b, the screws 28a and 28b, the lead wires 29a and 29b and the battery 21 to allow the electric current therethrough when the conductive member 24 contacts the electrodes 27a and 27b. When the pad pressing force is not generated, an elasticity of the spring separates the conductive member 24 from the electrodes 27a and 27b to cut off the electric circuit. Incidentally, a rigidity (spring constant) of the spring 25 is smaller than a rigidity of the brake pads 16a and 16b. Therefore, when the spring 25 is compressed between the insulating member 23 and the insulating plate 26 by the pad pressing force, the conductive member 24 contacts the electrodes 27a and 27b. By this switching operation, the piston position obtained when the spring 25 is compressed so that the clearance between the conductive member 24 and the electrodes 27a and 27b becomes zero is detected by detecting a change of the electric current through the element of the electric circuit with the ampere meter 19. Incidentally, the insulating member 23 and the insulating plate 26 are made of ceramic, and the spring 25 is coated with an insulating material, so that the electric current is prevented from flowing in the conductive members if the plunger 22 and the ball-screw rod 14 are conductive. Further, when the pad pressing force is increased after the conductive member 24 contacts the electrodes 27a and 27b, the conductive member 24 and the electrodes 27a and 27b also bear the pressing force.

The plunger 22 is linearly movable in the hollow area of the ball-screw rod 14 in a horizontal direction in FIG. 2. Therefore, a dimension of the plunger 22 in a direction perpendicular to the linear moving direction is slightly smaller than a dimension of the hollow area of the ball-screw rod 14. Incidentally, since such dimensional difference causes a provability of that a contaminant proceeds from an outer environment into the plunger to adhere to the electrodes to prevent the electric circuit is formed, a greased O ring 30 is mounted on the plunger 22. The ring 30 prevents the proceeding of contaminant, and damps the vibration of the plunger 22 so that the electric current signal measured by the ampere meter 19 is stabilized.

When the plunger moves linearly in the hollow area of the ball-screw rod 14, there is a provability of that the plunger 22 is inclined by an impact from outside to catch on the hollow area of the ball-screw rod 14 so that the linear movement thereof is prevented. Therefore, a ratio of the dimension L of the plunger in the linear moving direction with respect to the dimension M of the plunger in the direction perpendicular to the linear moving direction is made not less than 1. By this arrangement, the plunger can move correctly and accurately linearly in the hollow area of the ball-screw rod 14.

If the electro-mechanical brake actuator 6 is a floating type brake device, it is preferable for the pad contact position detector 18 to be arranged at a right side with respect to the disk rotor 7 in FIG. 2. If the pad contact position detector 18 is arranged at a left side with respect to the disk rotor 7 in FIG. 2, the whole of the electro-mechanical brake actuator 6 needs to be moved by the spring 25 so that the conductive member 24 is separated from the electrodes 27a and 27b when the pad pressing force decreases to zero, whereby a spring constant of the spring 25 needs to be great. If the pad contact position detector 18 is arranged at the right side with respect to the disk rotor 7a-7d, only the linearly movable members between the plunger 22 and the disk rotor 7 needs to be moved so that conductive member 24 is separated from the electrodes 27a and 27b, whereby the spring constant may be small.

Further, if the pad contact position detector 18 is arranged on the linearly movable brake pads 16a, 16b, piston 15, ball-screw rod 14 or the like to enable the pad pressing force to be applied directly to the plunger 22, the detection of pad contacting position can be more accurately in comparison with a case in which the pad contact position detector 18 is arranged on a non-linearly-movable member.

On the contrary, if, for example, the pad contact position detector 18 is arranged at an outside of the casing and the pressing force is transmitted through a distortion of the casing so that the pad contact position detector 18 is arranged on the non-linearly-movable member, since the pad pressing force is transmitted to the plunger 22 indirectly, the accuracy in detecting the pad contacting position is deteriorated. However, an effect of that the lead wires 29a, 29b of the pad contact position detector 18 are stationary is brought about so that a reliability of the lead wires 29a, 29b is improved.

Figure 4:
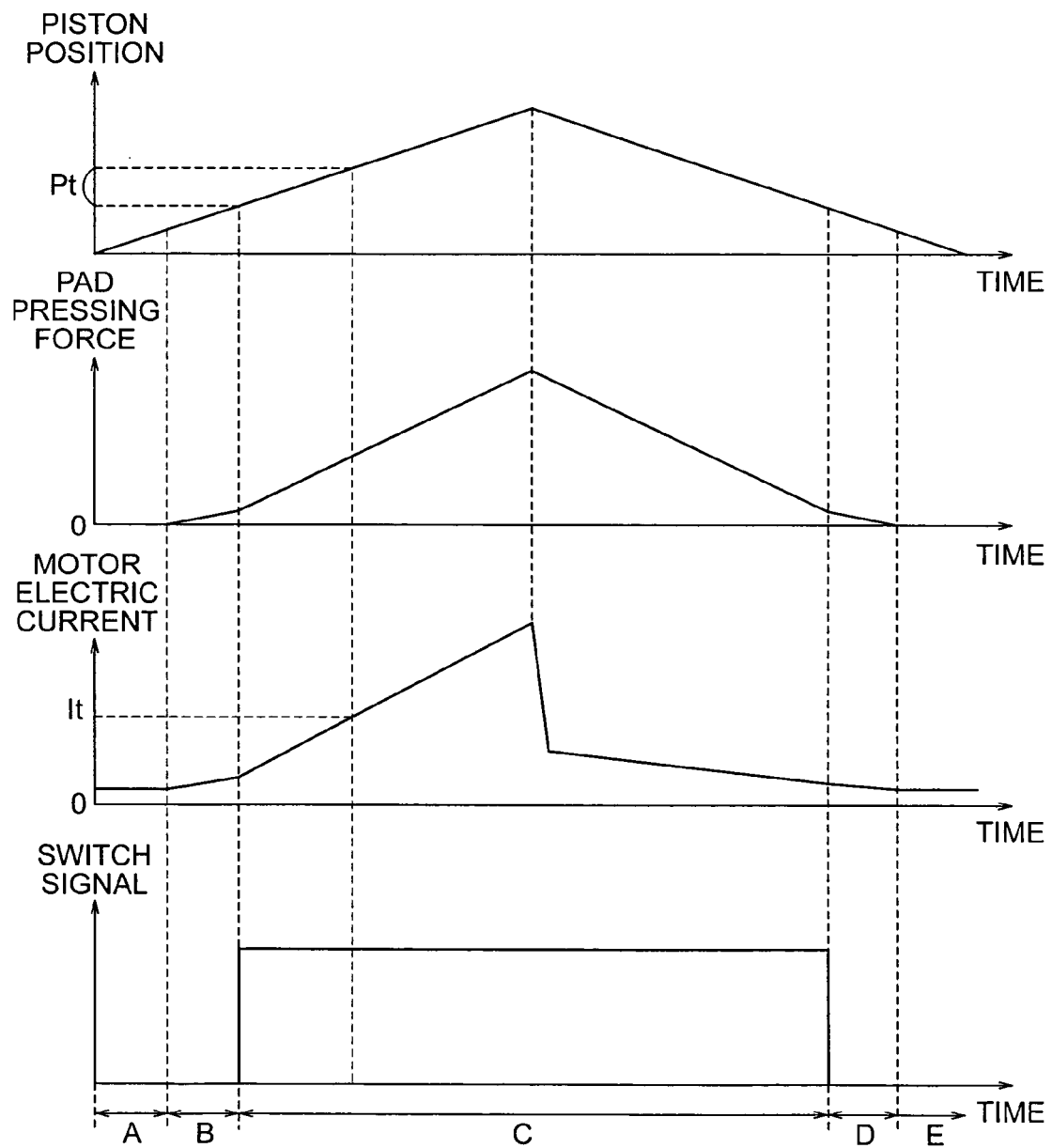
FIG. 4 includes views showing schematically relationships among signal, piston position, pad pressing force and motor current in the pad contacting position detector.

Next, a relationship among the piston position, the pad pressing force and the electric current (hereafter called as switch current) flowing through the electric circuit formed when the pad pressing force is generated in the pad contacting position detector is explained concretely with making reference to FIG. 4. FIG. 4 includes diagrams showing schematically the piston position, the pad pressing force, the motor current and the switch signal on abscissa representing time elapse, obtained when the piston is moved forward to increase the pad pressing force at constant velocity during a predetermined time period and subsequently moved backward to decrease the pad pressing force. Incidentally, at time elapse of zero, a pad clearance is maintained. Under this situation, time periods A, B, C, D and E in lower parts in FIG. 4 correspond respectively to a time period A in which the pad clearance is decreased, a time period B in which the brake pads 16a, 16b contact the disk rotors 7a-7d to compress the spring 25 so that the clearance between the conductive member 24 and the electrodes 27a, 27b is decreased, a time period C in which the clearance between the conductive member 24 and the electrodes 27a, 27b is zero so that the conductive member 24 contacts the electrodes 27a, 27b, and a time period D in which the clearance between the conductive member 24 and the electrodes 27a, 27b exists so that the pad pressing force is generated by only the elasticity of the spring 25, and a time period E in which the pad clearance is increased.

Figure 5:
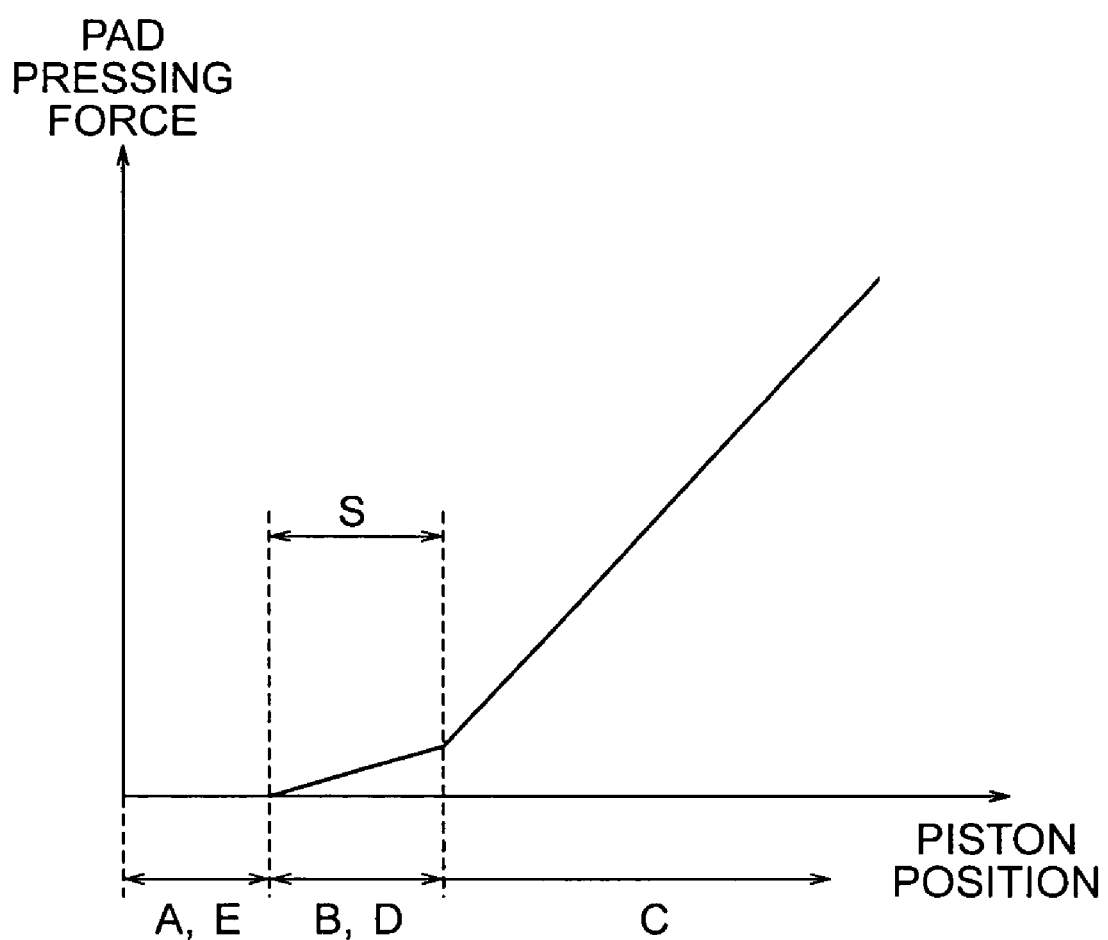
FIG. 5 is a view showing schematically a relationship between the piston position and the pad pressing force in the pad contacting position detector.

With making reference to FIG. 5, how to measure the actual pad contacting position is explained. FIG. 5 is view showing schematically a relationship between the piston position and the pad pressing force. A, B, C, D, E in FIG. 5 correspond to A, B, C, D, E in FIG. 4. That is, a range (A, E) corresponds to the piston position in which the pad clearance exists, a range (B, D) corresponds to the piston position in which the pad pressing force is borne by only the elasticity of the spring 25, and a range (C) corresponds to the piston position in which the pad pressing force is borne partially by the contact between the conductive member 24 and the electrodes 24a, 27b. A piston displacement value s corresponding to the range (B, D) is a distance from a start of contact between the brake pads 16a, 16b and the disk rotor 7a-7d to a start of generating the switch current when the piston is moved to increase the pad pressing force. Therefore, the pad contacting position is a piston position behind by s from the piston position at the change of the switch current. Further, when decreasing the pad pressing force, the pad contacting position may be a piston position ahead by s from the piston position at which the switch current becomes zero. Incidentally the value s is obtainable from a design or initial distance (which is limited by a mechanical stopper to be prevented from exceeding a predetermined value) between the conductive member 24 and the electrodes 24a, 27b, or obtainable experimentally (that is, for example, from a piston displacement between the change to zero or from zero of the switch current and a significant increase or decrease of the motor current for generating a reaction force against the force of the spring 25 in response to the contact or separate between the brake pad 16 and the disk rotor 7). As mentioned above, the pad contacting position can be easily obtainable by the pad contact position detector when increasing or decreasing the pad pressing force, and if the pad contacting position is an average position between the pad contacting position obtained when increasing the pad pressing force and the pad contacting position obtained when decreasing the pad pressing force, the pad contacting position can be measured more accurately. Further, when the braking is prevented, the piston is positioned away by not less than s from the piston position at which the switch current changes, so that the pad pressing force is prevented from being applied to the brake pad when the braking should be prevented.

When increasing the pad pressing force, the motor current increases in proportion to the piston position as shown in FIG. 4. Therefore, the brake is operated during the stoppage or running of the vehicle to inspect the pad contact position detector 18 and the motor current sensor 20. When the piston is moved to increase the pad pressing force with monitoring the switch current and motor current, and the switch current is kept zero although the motor current reaches a predetermined current value It, it is decided that the pad contact position detector 18 is in failure. Further, when the motor current is kept at not more than It although the piston is moved by Pt after the switch current becomes more than zero, it is decided that the motor current sensor is in failure.

Figure 6:
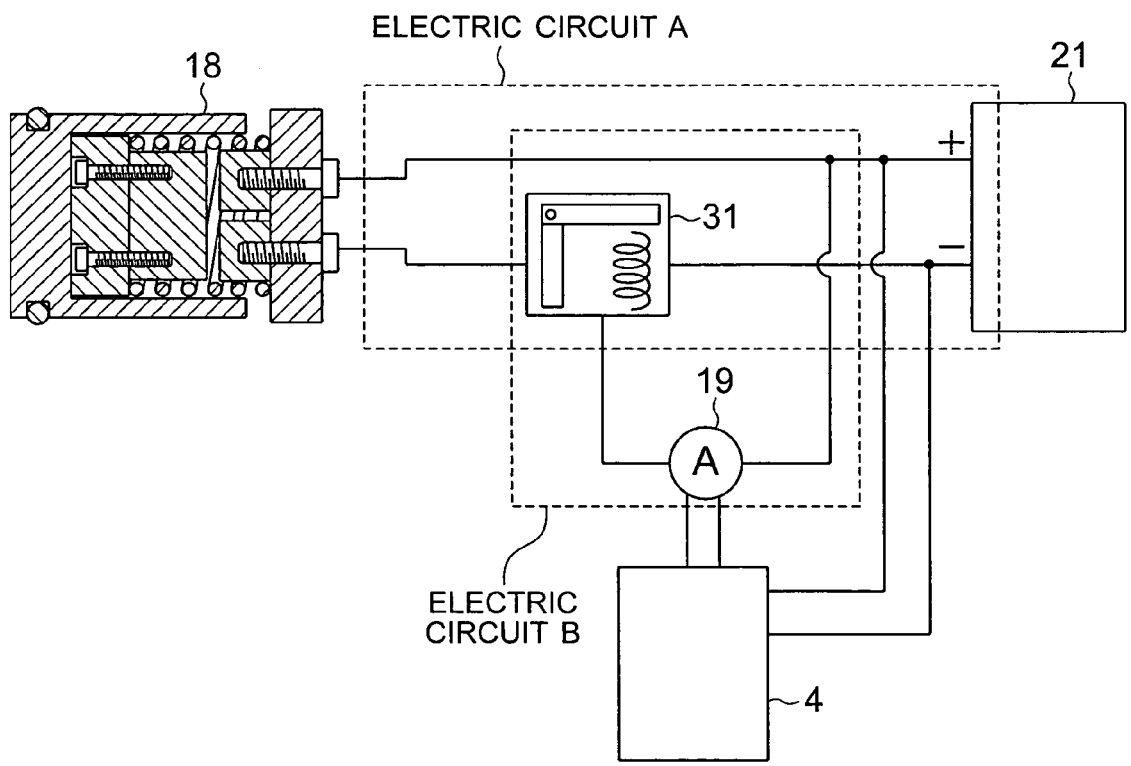
FIG. 6 is a view showing an electric circuit for inversing an output signal from the pad contacting position detector.

In the above mentioned pad contact position detector 18, the electric circuit is cut off to prevent the electric current from flowing therethrough when the pad pressing force is not generated, and the electric circuit is formed to allow the electric current to flow therethrough when the pad pressing force is generated. On the other hand, since a time period in which the pad pressing force is not generated is actually longer than a time period in which the pad pressing force is generated, it is preferable for inspecting the failure of the lead wires 29a, 29b that the electric current is detected by the electro-mechanical brake controller 4 when the pad pressing force is not generated, and the electric current is not detected by the electro-mechanical brake controller 4 when the pad pressing force is generated. FIG. 6 is a schematic view of an electric circuit by which an electric signal is input into the electro-mechanical brake controller 4 when the electric circuit (circuit A) is not formed by the pad contact position detector 18 so that a relay enables the electric current to be detected by the ampere meter 19, and the electric signal is prevented from being input into the electro-mechanical brake controller 4 when the electric circuit (circuit A) is formed by the pad contact position detector 18 so that the relay prevents the electric current from being detected by the ampere meter 19. A switch in the relay 31 is closed to form a circuit B to enable the electric signal to be input to the electro-mechanical brake controller 4a-4d, when the circuit is cut off. On the other hand, the switch in the relay 31 is opened to cut off the circuit B to prevent the electric signal from being input to the electro-mechanical brake controller 4, when the circuit is formed to allow the electric current to flow therethrough. By this electric circuit, whether or not the lead wires is in failure can be inspected when the braking force is not generated, a safety for braking during the vehicle running is improved.

The pad contact position detector 18 is effectively applicable to the electro-mechanical brake including a plurality of the actuators as shown in JP-hei-7-144636-A. This publication discloses a braking device in which the brake pad is driven by the motor during an initial stage of brake operation of low load and great stroke, and the pad pressing force is adjusted desirably by a piezo-electric element during a brake operation of high load and small stroke. If the pad contact position detector 18 is applied to this system, a change between the motor drive and the piezo-electric element drive can be performed effectively with making reference to the piston position at which the switch current changes, so that a brake controllability is improved.

Figure 7:
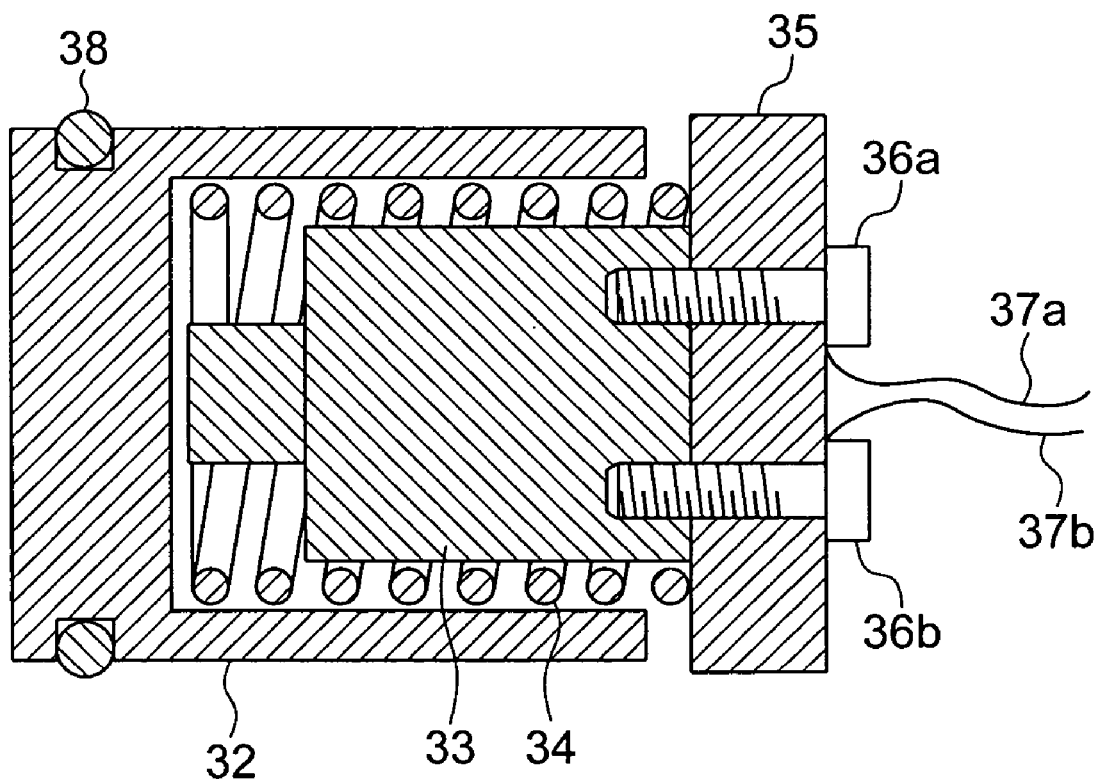
FIG. 7 a view showing another embodiment of the pad contacting position detector.

FIG. 7 shows a second embodiment of the invention. Since a major part of the electro-mechanical brake of this embodiment is similar to the first embodiment, only a distinctive part is explained. As shown in FIG. 7, the pad contact position detector of this embodiment is characterized by a switch 33 whose stroke is greater than the initial clearance between the conductive member 24 and the electrodes 27a, 27b in the first embodiment, and the pad pressing force borne between a right end of a plunger 32 and a switch mounting plate 35. Similarly to the first embodiment regarding function, when the switch 33 is compressed by the plunger 32 to form the electric circuit, the electric current flows between the lead wires 37a and 37b. In this pad contact position detector, although a movable range of the piston urged by a spring 34 to bear the pad pressing force is greater than that in the first embodiment so that the accuracy in detecting the pad contacting position is deteriorated, there are advantages of that the plunger 32 and the switch contact each other at single point so that the electric signal detected by the ampere meter 19 is stabilized against an inclination of axis, an electric contact point is received by the switch 33 to be easily protected, and the switch structure and the load bearing structure are separated from each other so that the switch 33, the plunger 32 and the switch mounting plate 35 can be formed of respective suitable materials.

The switch may be a positional sensor measuring a position of the linearly movable member with respect to the frictional member. If a part of the switch (as a positional sensor measuring a position of the linearly movable member with respect to the frictional member) is mounted on the linearly movable member, another part of the switch is mounted on the frictional member, the switch detects the change from the contact to the separation when the switch detects a change from an electrical connection between the part of the switch and the another part of the switch to an electrical disconnection between the part of the switch and the another part of the switch, and the switch detects the change from the separation to the contact when the switch detects a change from the electrical disconnection to the electrical connection, it is preferable for correctly detecting the change between the contact and the separation or secure and sufficient compressing force transmission between the frictional member and the linearly movable member that a major part of the compressing force greater than the part of the compressing force transmitted through the elastic member is transmitted through the part of the switch and the another part of the switch contacting each other when the braking force increases to more than a certain degree after the change from the separation to the contact, that is, for example, when the motor generates its maximum torque or the brake generates its maximum braking force.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electro-mechanical brake for a wheel, comprising a motor, a linearly movable member driven by the motor to move linearly, a rotary member connected to the wheel to rotate with the wheel, a frictional member operatively connected to the linearly movable member to be moved linearly by the linearly movable member to press the frictional member against the rotary member and generate a braking force for the wheel, a detector for measuring a position of the linearly movable member, an elastic member which is operatively arranged between the linearly movable member and the frictional member to bias the frictional member away from the linearly movable member; said elastic member bears at least a part of a compressive force for pressing the frictional member against the rotary member, and a switch arranged parallel to the elastic member and configured to output a signal, when the switch detects at least one of that a distance between the linearly movable member and the frictional member becoming equal to a predetermined distance and that the distance between the linearly movable member and the frictional member becoming different from the predetermined distance, and the switch bears another part of the compressive force so that the another part of the compressive force is transmitted between the linearly movable member and the frictional member through the switch.

2. The electro-mechanical brake according to claim 1, wherein the at least a part of the compressive force to be borne by the elastic member is greater than the another part of the compressive force to be borne by the switch when the switch detects the at least one of that the distance between the linearly movable member and the frictional member becomes equal to the predetermined distance and that the distance between the linearly movable member and the frictional member becomes different from the predetermined distance.

3. The electro-mechanical brake according to claim 1, wherein the switch detects that the distance between the linearly movable member and the frictional member becomes equal to the predetermined distance when the switch detects a change from a separation between the linearly movable member and the frictional member to the contact between the linearly movable member and the frictional member, and the switch detects that the distance between the linearly movable member and the frictional member becomes different from the predetermined distance when the switch detects a change from the contact to the separation.

4. The electro-mechanical brake according to claim 3, wherein a part of the switch is mounted on the linearly movable member, another part of the switch is mounted on the frictional member, the switch detects the change from the contact to the separation when the switch detects a change from an electrical connection between the part of the switch and the another part of the switch to an electrical disconnection between the part of the switch and the another part of the switch, and the switch detects the change from the separation to the contact when the switch detects a change from the electrical disconnection to the electrical connection.

5. The electro-mechanical brake according to claim 3, wherein the switch bears the another part of the compressive force to be transmitted through the contact between the linearly movable member and the frictional member so that the another part of the compressive force is transmitted between the linearly movable member and the frictional member through the switch, and the at least a part of the compressive force to be borne by the elastic member is greater than the another part of the compressive force to be borne by the switch when the switch detects the change between the contact and the separation between the linearly movable member and the frictional member.

6. The electro-mechanical brake according to claim 1, wherein the detector detects the position of the linearly movable member in response to the output of the signal, and the motor is controlled to drive the linearly movable member on the basis of the detected position so that the linearly movable member is moved away from the detected position by a distance sufficient for preventing the compressive force from being transmitted between the frictional member and the rotary member when preventing the braking force from being generated.

7. The electro-mechanical brake according to claim 1, wherein a value of the signal is changeable non-linearly when the switch detects the at least one of that the distance between the linearly movable member and the frictional member becomes equal to the predetermined distance and that the distance between the linearly movable member and the frictional member becomes different from the predetermined distance.

8. The electro-mechanical brake according to claim 1, wherein the frictional member includes first and second parts separable from each other, the first part is arranged to face to the rotary member so that the first part is capable of being pressed against the rotary member, and the second part is connectable to the linearly movable member so that the compressive force is transmitted between the first part and the linearly movable member through the second part.

9. The electro-mechanical brake according to claim 1, wherein the motor has a rotor and a stator, the linearly movable member is capable of being driven by the rotor to move linearly with respect to the stator, and the detector is capable of measuring the position of the linearly movable member from a positional relationship in rotation between the rotor and the stator.

10. The electro-mechanical brake according to claim 1, wherein the switch detects that the distance between the linearly movable member and the frictional member becomes equal to the predetermined distance when the switch detects that a clearance between linearly movable member and the frictional member decreases to a predetermined value, and the switch detects that the distance between the linearly movable member and the frictional member becomes different from the predetermined distance when the switch detects that the clearance increases from the predetermined value.

11. The electro-mechanical brake according to claim 1, wherein all of the compressive force is borne by the elastic member.

12. The electro-mechanical brake according to claim 1, wherein part of the compressive force is borne by the contact between the linearly movable member and the frictional member.

13. The electro-mechanical brake according to claim 1, wherein the switch and the elastic member are arranged in parallel to each other between the linearly movable member and the frictional member so that the at least a part of the compressive force to be borne by the elastic member is prevented from being borne by the switch.

* * * * *